(12) United States Patent
Chang et al.

(10) Patent No.: US 8,935,484 B2
(45) Date of Patent: Jan. 13, 2015

(54) WRITE-ABSORBING BUFFER FOR NON-VOLATILE MEMORY

(75) Inventors: Jichuan Chang, Sunnyvale, CA (US); Parthasarathy Ranganathan, San Jose, CA (US); David Roberts, Ann Arbor, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 281 days.

(21) Appl. No.: 13/077,842

(22) Filed: Mar. 31, 2011

(65) Prior Publication Data

US 2012/0254507 A1  Oct. 4, 2012

(51) Int. Cl.
*G06F 12/08* (2006.01)
*G06F 11/14* (2006.01)
*G06F 11/20* (2006.01)

(52) U.S. Cl.
CPC ........ *G06F 12/0868* (2013.01); *G06F 11/1441* (2013.01); *G06F 11/2015* (2013.01)
USPC .......................................... 711/143; 711/103

(58) Field of Classification Search
None
See application file for complete search history.

(56) References Cited

U.S. PATENT DOCUMENTS

| | | | | |
|---|---|---|---|---|
| 5,359,723 A * | 10/1994 | Mathews et al. | ............... | 711/122 |
| 7,636,814 B1 * | 12/2009 | Karr et al. | ..................... | 711/143 |
| 7,890,689 B2 * | 2/2011 | Lam et al. | ......................... | 711/6 |
| 8,244,969 B2 * | 8/2012 | McWilliams et al. | ........ | 711/103 |
| 8,255,613 B2 * | 8/2012 | Abali et al. | .................... | 711/103 |
| 8,271,753 B2 * | 9/2012 | Nemoto et al. | ............... | 711/162 |

* cited by examiner

*Primary Examiner* — Gary Portka
(74) *Attorney, Agent, or Firm* — Hewlett-Packard Patent Department; Marcia Ramos Chang

(57) ABSTRACT

A write-absorbing, volatile memory buffer for use with a processor module and a non-volatile memory is disclosed. The write-absorbing buffer operates as a dirty cache that can be used to look up both read and write requests, although allocating new blocks only for write requests and not read requests. The blocks are small sized, and a write-only least-recently used cache replacement policy is used to transfer data in the blocks to the non-volatile memory. The write-absorbing buffer can be used to store copy-on-write pages for at least one virtual machine associated with the processor module and reduce write overhead to the non-volatile memory.

18 Claims, 13 Drawing Sheets

WRITE-ABSORBING BUFFER FOR NON-VOLATILE MEMORY

BACKGROUND

Emerging non-volatile memories such as Phase-Change Memory ("PCM") and Memristors are likely to replace DRAM and Flash as the main data stores in future computing. Besides having the desirable characteristic of retaining data even when not powered, these emerging non-volatile memories have read speeds that are comparable to DRAM and are typically higher in real-density and hence capacity. Other key advantages include low power consumption and reduced system complexity, making them an attractive choice for a variety of electronic devices, such as mobile and handheld devices, information appliances and consumer electronics products.

These advantages come at the price of a limited write endurance (i.e., the number of rewrites a given memory cell can take) and a much higher write latency/energy (e.g., ten times higher) than read energy. Various techniques have been proposed to address these limitations, including, for example, write reduction, wear-leveling, and fault tolerance. Write reduction attempts to reduce the number of writes to the non-volatile memory, wear-leveling maximizes the useful lifetime of the memory, and fault tolerance attempts to work around failed reads or writes of data. These techniques can be used alone or in combination to improve the write-related capabilities of a non-volatile memory and therefore achieve a longer memory lifetime and overall higher performance.

BRIEF DESCRIPTION OF THE DRAWINGS

The present application may be more fully appreciated in connection with the following detailed description-taken in conjunction with the accompanying drawings, in which like reference characters refer to like parts throughout, and in which.

DETAILED DESCRIPTION

Figure 1:
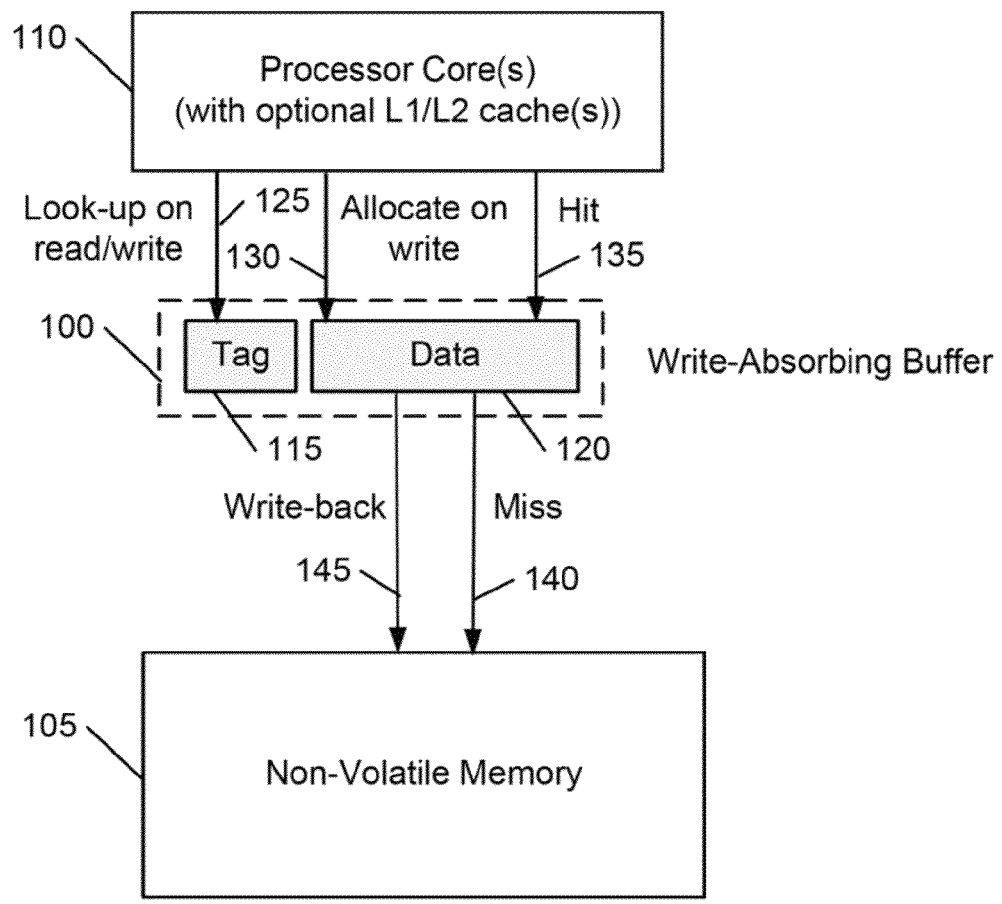
FIG. 1 illustrates an example of a write-absorbing buffer for use with a non-volatile memory.

A write-absorbing, volatile memory buffer for use with a non-volatile memory data store is disclosed. The write-absorbing buffer is placed between at least one processor core and a non-volatile memory data store to reduce the number of write requests to the non-volatile memory data store and improve its overall writing performance and lifetime. The non-volatile memory data store, as generally described herein below, consists of a memory that retains its stored data even when not powered, such as, for example, a PCM or a Memristor.

In various embodiments, the write-absorbing buffer operates as a "dirty" cache that can be used to look up both read and write requests, although allocating new blocks only for write requests and not read requests. A dirty cache, as generally described herein, is a buffer/cache that temporarily holds data until it is committed into memory. The data is said to be dirty when it is rewritten into the cache by the processor(s). A cache replacement policy is used to select the dirty cache entry for replacement (e.g., as a result of a cache miss) and transfer it into memory. The new data is written into the cache at the location vacated by the dirty entry.

A Write-Only Least-Recently-Used ("LRU") policy is implemented to reduce the number of writes into the non-volatile memory. The Write-Only LRU policy filters out read requests from the processor(s) when updating data in the blocks of the write-absorbing buffer, that is, only the least recently written blocks are updated. By filtering out read requests, the Write-Only LRU policy has the potential to keep data that are more likely to be written (instead of read and written) in the future in the write-absorbing buffer and further reduce writes to the non-volatile memory.

The write-absorbing buffer is designed to be small, for example, at 64 bytes or the same size as the processor(s) cache, which is much smaller than a typical OS page (e.g., 4 kB) or a storage LBA (e.g., 512 bytes). The use of smaller blocks allows writes to be detected at a smaller granularity and effectively eliminates the need to detect silent stores, which are store operations that do not change the contents of the stored location (e.g., write requests with the same values as in the write-absorbing buffer).

In one embodiment, a write-back buffer is placed between the write-absorbing buffer and the non-volatile memory to temporarily store write-back requests and bridge between any write speed differences between the write-absorbing buffer and the non-volatile memory. Because only write requests trigger the allocation of blocks in the write-absorbing buffer, its replacement request rate can be lower than a cache that stores both clean and dirty data, hence reducing the required write-back buffer size. To safely write dirty data back to the non-volatile memory when there is a power failure, either a capacitor or a battery backup is used to provide the needed energy.

The combination of a dirty-data, small-sized write-absorbing buffer and backup power allows the write-absorbing buffer to effectively capture considerably more write requests than a conventional cache or a Flash-aware cache, thereby achieving the goal of significantly reducing the write traffic to the non-volatile memory. Further write traffic reductions can be achieved by using a Bloom filter before accessing the write-absorbing buffer to quickly determine whether a block is not cached in the write-absorbing buffer and therefore direct the read/write requests to the non-volatile memory for write-absorbing buffer misses. And as described in more detail herein below, the write-absorbing buffer can be used to reduce write traffic to the non-volatile memory during copy-on-write ("COW") events for OS pages in a virtualized environment.

It is appreciated that embodiments of the write-absorbing buffer described herein below may include additional components and features. Some of the components and features may be removed and/or modified without departing from a scope of the write-absorbing buffer. It is also appreciated that, in the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments. Also, the embodiments may be used in combination with each other.

Reference in the specification to "an embodiment," "an example" or similar language means that a particular feature, structure, or characteristic described in connection with the embodiment or example is included in at least that one example, but not necessarily in other examples. The various instances of the phrase "in one embodiment" or similar phrases in various places in the specification are not necessarily all referring to the same embodiment.

Referring now to FIG. 1, an example of a write-absorbing buffer for use with a non-volatile memory is described. Write-absorbing buffer 100 is a volatile memory, small sized (e.g., 64 bytes) buffer for use with a non-volatile memory (e.g., non-volatile memory 105) and a processor module including one or more processor(s) or processor core(s), such as processor module 110, which may also include one or more caches integrated thereon (e.g., L1/L2 caches). The write-absorbing buffer is designed to be small, for example, at 64 bytes or the same size as the cache(s) in the processor core(s) in the processor module, which is much smaller than a typical OS page (e.g., 4 kB) or a storage LBA (e.g., 512 bytes). The use of smaller blocks allows writes to be detected at a smaller granularity and effectively eliminate the need to detect silent stores, which are store operations that do not change the contents of the stored location (e.g., write requests with the same values as in the write-absorbing buffer).

The write-absorbing buffer 100 operates as a dirty cache between processor module 110 and non-volatile memory 105, and as such, it has a tag portion 115 and a data portion 120. Tag portion 115 lists indexes of the data in the data portion 120. The data portion 120 is organized into small blocks, with each block storing data to be written into the non-volatile memory 105. Processor module 110 accesses the tag portion 115 in the write-absorbing buffer 100 to look-up both read and write requests 125 to non-volatile memory 105, but only the write requests (and not the read requests) are allocated blocks 130 in the data portion 120 of the write-absorbing buffer 100.

When the processor core(s) in the processor module 110 needs to read from or write to a location in the non-volatile memory 105, it first checks whether that memory location is in the write-absorbing buffer 100. This is accomplished by comparing the address of the memory location to all tags in the tag portion 115 that might contain that address. If the processor core(s) finds that the memory location is in the write-absorbing buffer 100, a data hit 135 occurs. In the case of a data hit, the processor core(s) in the processor module 110 immediately reads or writes the data in the data portion 120 of the write-absorbing buffer 100. Otherwise, in the case of a miss for a write request, the write-absorbing buffer 100 allocates a new entry, which comprises the tag just missed and a copy of the data to be written. In the case of a miss 140 for a read request, the data is read directly from the non-volatile memory 105 and it is not allocated a new entry in the write-absorbing buffer 100.

Data that is written into the write-absorbing buffer 100 is transferred (or "written-back" 145) into the non-volatile memory 105 only when the data needs to be replaced or evicted from the write-absorbing buffer 100 (e.g., a new entry needs to be allocated in the buffer but the buffer is full). In various embodiments, a Write-Only, Least-Recently-Used ("LRU") replacement policy is implemented to replace entries in the write-absorbing buffer 100 with the goal of reducing the number of writes into the non-volatile memory 105. The Write-Only LRU policy replaces the least recently written entries in the write-absorbing buffer 100. That is, all the read requests from the processor core(s) in the processor module 110 are filtered out when updating data in the blocks of the write-absorbing buffer 100. By filtering out read requests, the Write-Only LRU policy has the potential to keep data that are more likely to be written (instead of read and written) in the future in the write-absorbing buffer 100.

Figure 2:
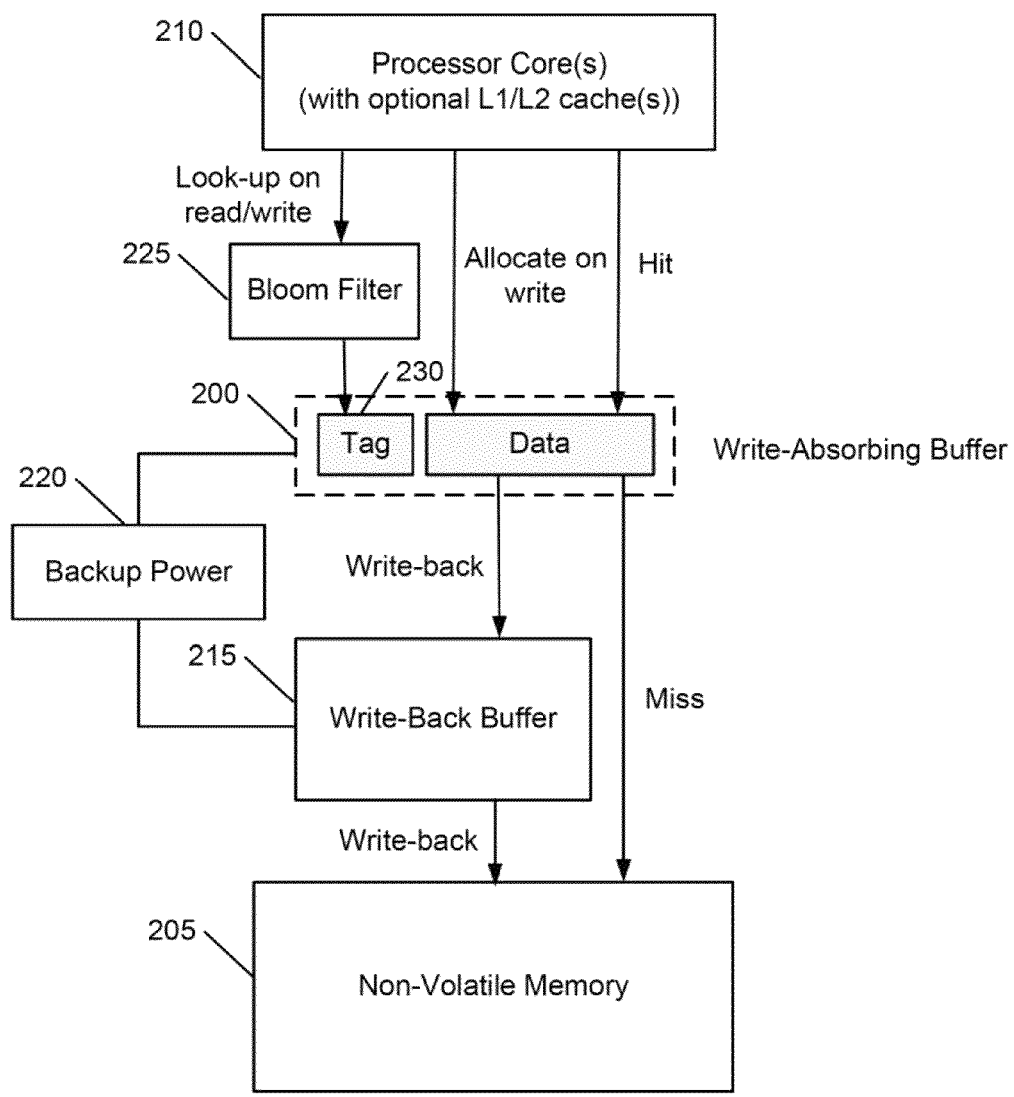
FIG. 2 illustrates another example of a write-absorbing buffer for use with a non-volatile memory.

Further reductions in the write traffic to the non-volatile memory 105 can be accomplished with the addition of a write-back buffer between the write-absorbing buffer 100 and the non-volatile memory 105. FIG. 2 illustrates another example of a write-absorbing buffer for use with a non-volatile memory. Write-absorbing buffer 200 is placed between a non-volatile memory 205 and a processor module 210 including one or more processor or processor core(s). A write-back, volatile memory buffer 215 is placed between the write-absorbing buffer 200 and the non-volatile memory 205 to temporarily store write-back requests and bridge between any write speed difference between the write-absorbing buffer 200 and the non-volatile memory 205. Because only write requests trigger the allocation of blocks in the write-absorbing buffer 200, its replacement request rate can be lower than a cache that stores both clean and dirty data, hence reducing the size of the write-back buffer 215.

Another improvement in the write performance of the non-volatile memory 205 can be achieved by using a backup power (e.g., a capacitor or a battery) 220. Since the write-absorbing buffer 200 is a volatile memory, having the backup power 220 ensures that data will be safely written back to the non-volatile memory 200 in the event of a power failure. The backup power 220 can be used to provide backup to both the write-absorbing buffer 200 and the write-back buffer 215.

It is appreciated that the combination of the dirty-data, small-sized write-absorbing buffer 200 and the backup power 220 allows the write-absorbing buffer 200 to effectively capture considerably more write requests than a conventional cache or a Flash-aware cache, thereby achieving the goal of significantly reducing the write traffic to the non-volatile memory.

Further write traffic reductions are achieved by using a Bloom filter 225 before accessing the write-absorbing buffer 200. Bloom filter 225 is able to quickly determine whether a block is not cached in the write-absorbing buffer 200 and therefore more efficiently direct the read/write requests to the non-volatile memory 205 for write-absorbing buffer 200 misses. A Bloom filter, as generally described herein, is a space-efficient probabilistic data structure that is used to test whether an element is a member of a set. Instead of having processor module 210 directly access the tag portion 230 in the write-absorbing buffer 200 to look-up read and write requests to non-volatile memory 205, the processor module 210 first checks the Bloom filter 225 to determine whether a miss will occur.

The Bloom filter 225 is much smaller and more energy efficient than the tag portion 230, and can quickly tell whether a block is not cached in the write-absorbing buffer 200 and therefore more efficiently direct the read/write requests to the non-volatile memory 205 in case of write-absorbing buffer misses. One known drawback of using a Bloom filter, however, is the possibility of having false positives, e.g., the possibility that the Bloom filter 225 will detect a hit in the write-absorbing buffer 200 when in fact there is none. As described herein below, this can be handled by checking the tag portion in the write-absorbing buffer 200 to verify whether a hit has occurred.

It is appreciated that processor modules 110 and 210 may include one or more processor or processor core(s). It is also appreciated that the processor modules 110 and 210 may have an integrated L1 cache and a L2 cache. In this case, the write-absorbing buffers 100 and 200 may provide a further level in a write-efficient memory hierarchy. Alternatively, the write-absorbing buffers 100 and 200 can be used in place of the L1 and/or the L2 caches in the processor modules 110 and 210. It is further appreciated that the write-absorbing buffers 100 and 200 may be implemented in both hardware and software and at different levels of the memory hierarchy (e.g., processor cache, DRAM cache on a non-volatile memory module, DRAM module as a cache for a group of NMV modules).

Figure 3A:
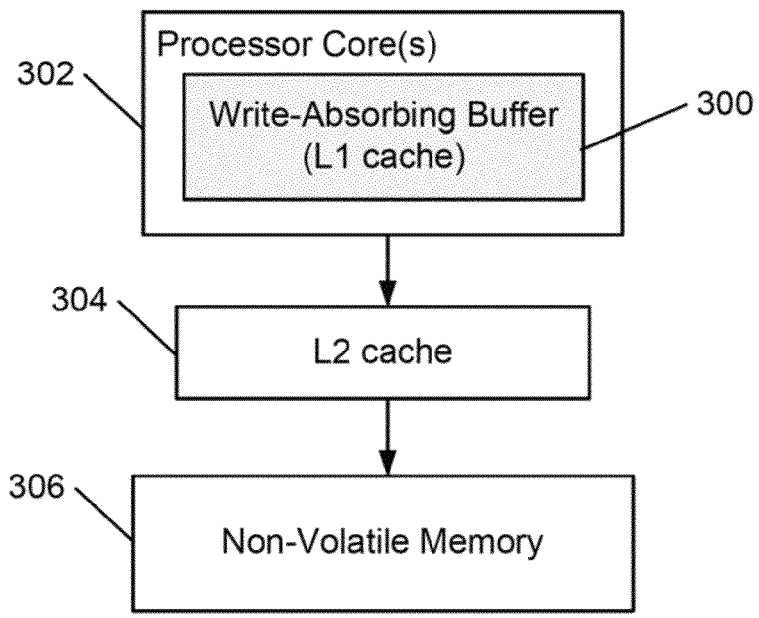
FIGS. 3A-I illustrate architecture configurations in which a write-absorbing buffer may be used with a non-volatile memory.
Figure 3B:
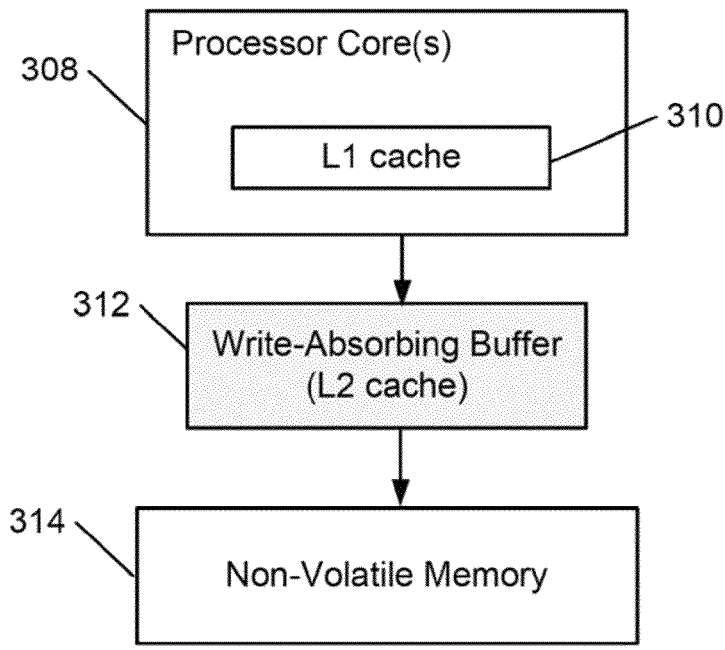
Figure 3C:
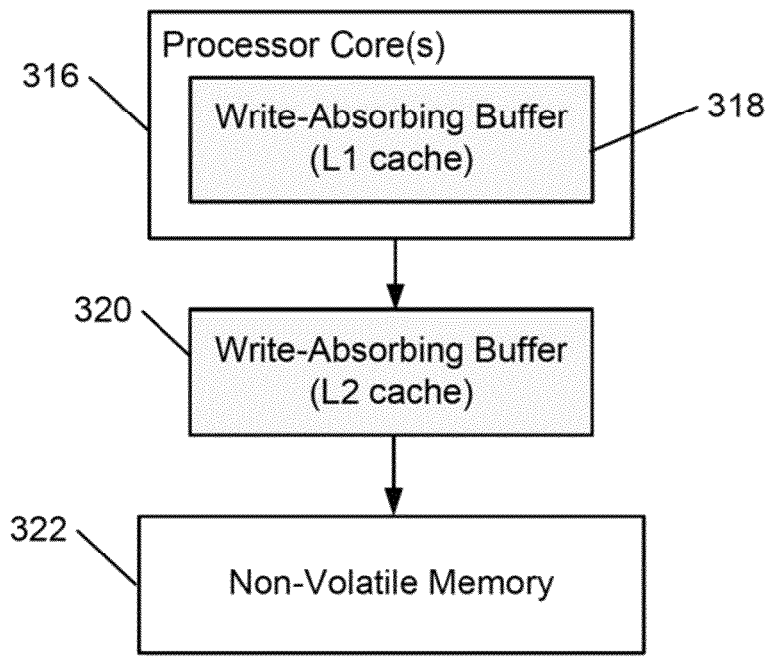

Accordingly, FIGS. 3A-I show example architecture configurations in which a write-absorbing buffer may be used with a non-volatile memory. In FIG. 3A, the write-absorbing buffer 300 is used as an L1 cache within a processor module 302 including one or more processor(s) or processor core(s). The write-absorbing buffer 300 may be used together with an optional L2 cache 304 to improve the overall write performance of the non-volatile memory 306. In FIG. 3B, the write-absorbing buffer 312 is used as an L2 cache (or the second level in a memory hierarchy) for a processor module 308 including one or more processor(s) or processor core(s) and having an L1 cache 310. The write-absorbing buffer 312 is used to improve the write performance of the non-volatile memory 314. FIG. 3C illustrates that a write-absorbing buffer may be used as both an L1 cache (such as the write-absorbing buffer 318 in the processor module 316) and as an L2 cache (such as the write-absorbing buffer 320) to improve the write performance of the non-volatile memory 322.

Figure 3D:
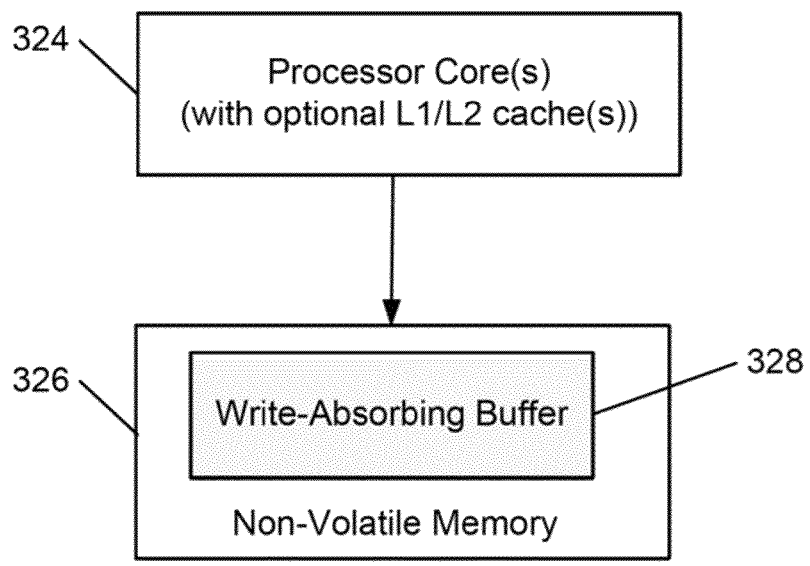
Figure 3E:
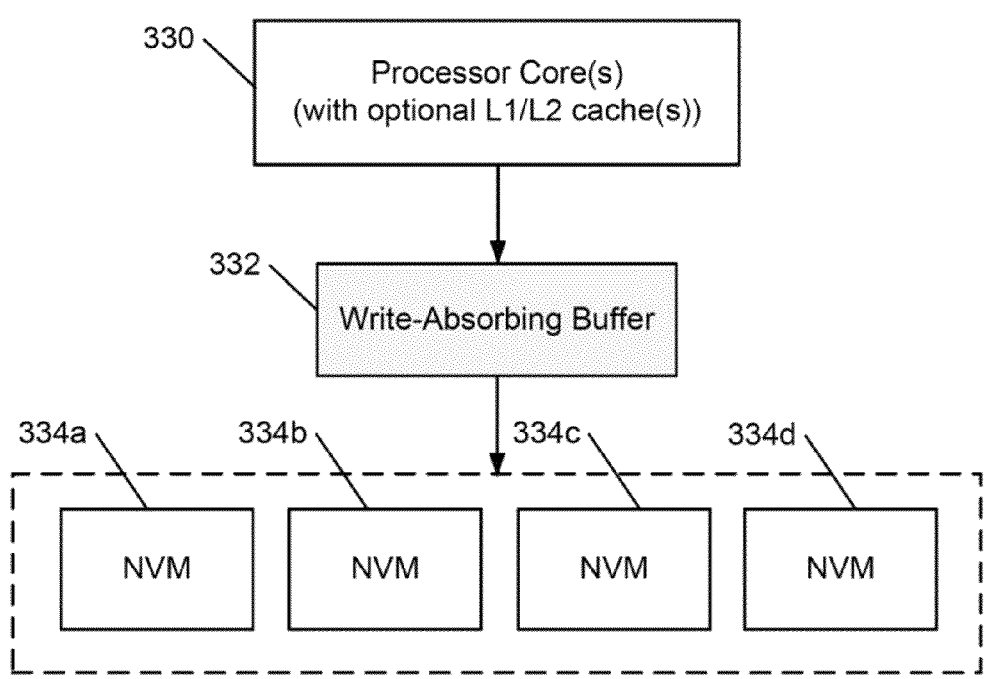

It is appreciated that in FIGS. 3A-C the write-absorbing buffers are shown as being connected to but not a part of the non-volatile memories. An alternative configuration is illustrated in FIG. 3D, which shows a write-absorbing buffer 328 integrated with the non-volatile memory 326 in a single module. The processor module 324 may have optional L1 and L2 caches to further improve the performance of the non-volatile memory 326.

Figure 3F:
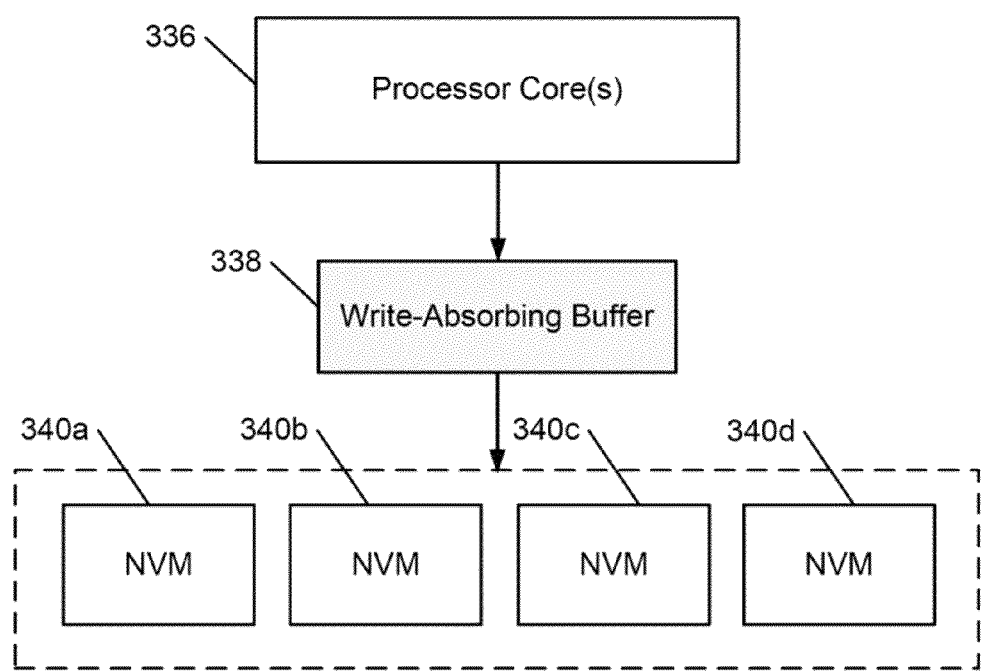

In various other embodiments, a write-absorbing buffer can be used as a buffer for a group of non-volatile memories. For example, in FIG. 3E, the write-absorbing buffer 332 is used as a buffer for a group of non-volatile memories 334a-d. The write-absorbing buffer 332 is connected to a processor module 330 that may include optional L1 and L2 caches. Alternatively, as shown in FIG. 3F, a write-absorbing buffer (e.g., the write-absorbing buffer 338) may be connected to a processor module (e.g., processor module 336) that does not include any L1 or L2 caches. In this case, the write-absorbing buffer 338 is used as the sole memory hierarchy level between the processor module 336 and the group of non-volatile memories 340a-d.

Figure 3G:
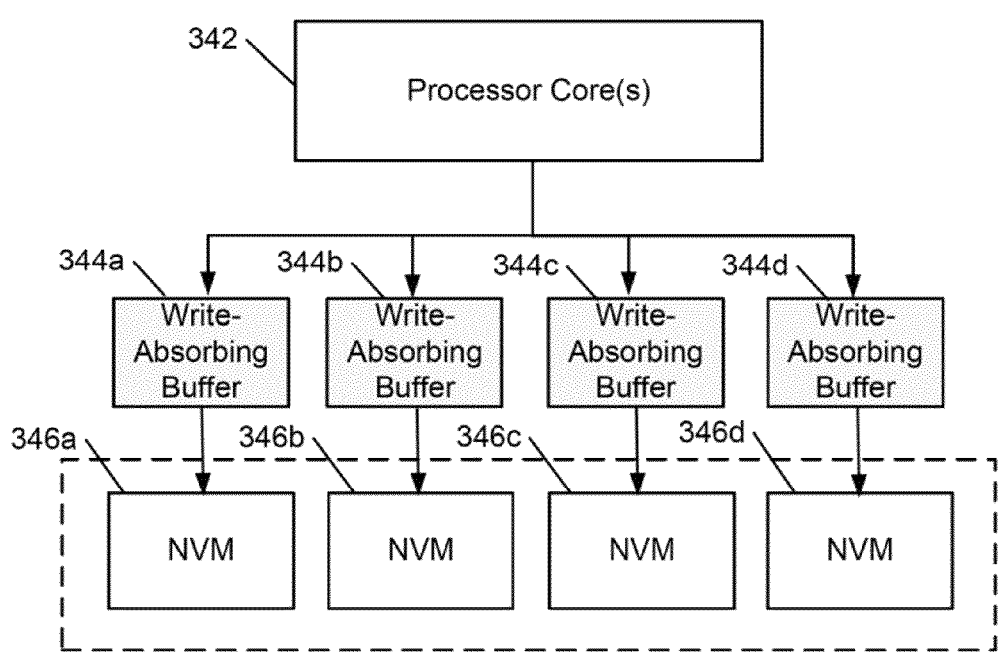

Another configuration is illustrated in FIG. 3G, having a single write-absorbing buffer as the sole memory hierarchy level between a processor module 342 and each non-volatile memory in a group of non-volatile memories. For example, the write-absorbing buffer 344a is used as a buffer for the non-volatile memory 346a, the write-absorbing buffer 344b is used as a buffer for the non-volatile memory 346b, the write-absorbing buffer 344c is used as a buffer for the non-volatile memory 346c, and the write-absorbing buffer 344d is used as a buffer for the non-volatile memory 346d.

Figure 3H:
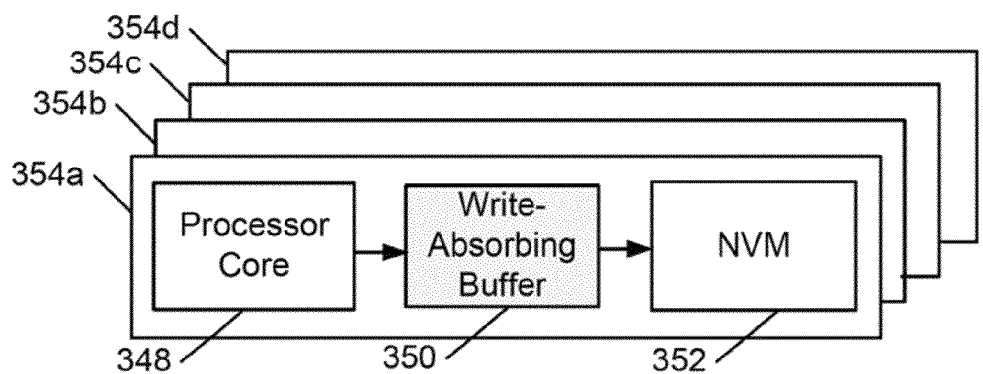
Figure 3I:
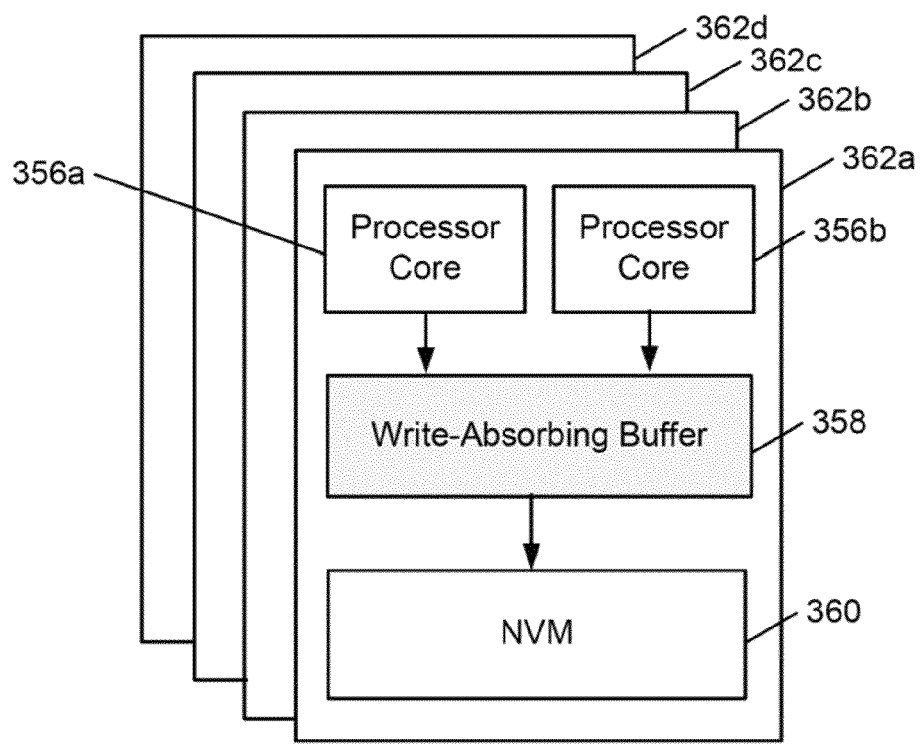

Further embodiments include those shown in FIG. 3H, which illustrates a side-stacked architecture, and FIG. 3I, which illustrates a 3D-stacked architecture. In FIG. 3H, the write-absorbing buffer 350 is co-located with a processor core 348 and a non-volatile memory 352 on a single die stack 354a that is part of a group of stacked dies 354a-d. And in FIG. 3I, the write-absorbing buffer 358 is co-located with the processor cores 356a-b and the non-volatile memory 360 on a single die stack 362a that is part of a group of stacked dies 362a-d.

It is appreciated that the architecture configurations illustrated in FIGS. 3A-I for using a write-absorbing buffer with a non-volatile memory are shown for purposes of illustration only. Additional architecture configurations may be designed in which a write-absorbing buffer is used to improve the write performance of a non-volatile memory. For example, write-absorbing buffers may be used with one or multiple non-volatile memories and one or multiple processor cores, with or without L1/L2 caches or other memory components. A write-absorbing buffer can also be used with a non-volatile memory as a cache for other non-volatile memory devices. It is also appreciated that the architecture configurations may include other components not shown in the figures, such as, for example, the Bloom filter and write-back buffer described above with reference to FIG. 2, memory controllers, memory buses, and so forth.

Figure 4:
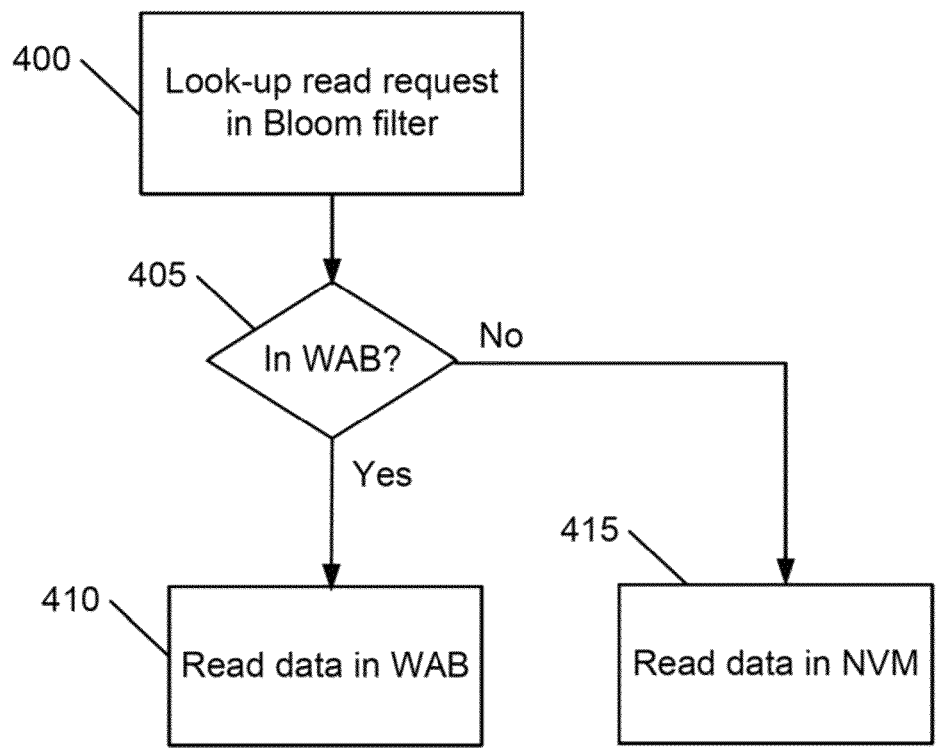
FIG. 4 is an example flowchart for reading data in a non-volatile memory using a write-absorbing buffer.

Attention is now directed to FIG. 4, which illustrates an example flowchart for reading data in a non-volatile memory using a write-absorbing buffer. When a processor module sends a read request to a non-volatile memory (denoted "NVM" in the figure), the read request is looked up in a Bloom filter before accessing a write-absorbing buffer connected to the non-volatile memory (400). If the Bloom filter indicates (405) that the data is in the write-absorbing buffer (denoted "WAB" in the figure), the data is then read from the buffer (410). Otherwise, the data is read directly from the non-volatile memory (415).

It is appreciated that this simple read request operation is implemented to allow the write-absorbing buffer to focus on improving the write performance of the non-volatile memory. Note that there is no allocation of a new entry in the write-absorbing buffer when the data to be read is not found in the buffer. In this case, the data is simply read from the non-volatile memory. Allocations of new entries in the write-absorbing buffer are implemented solely for write requests.

Figure 5:
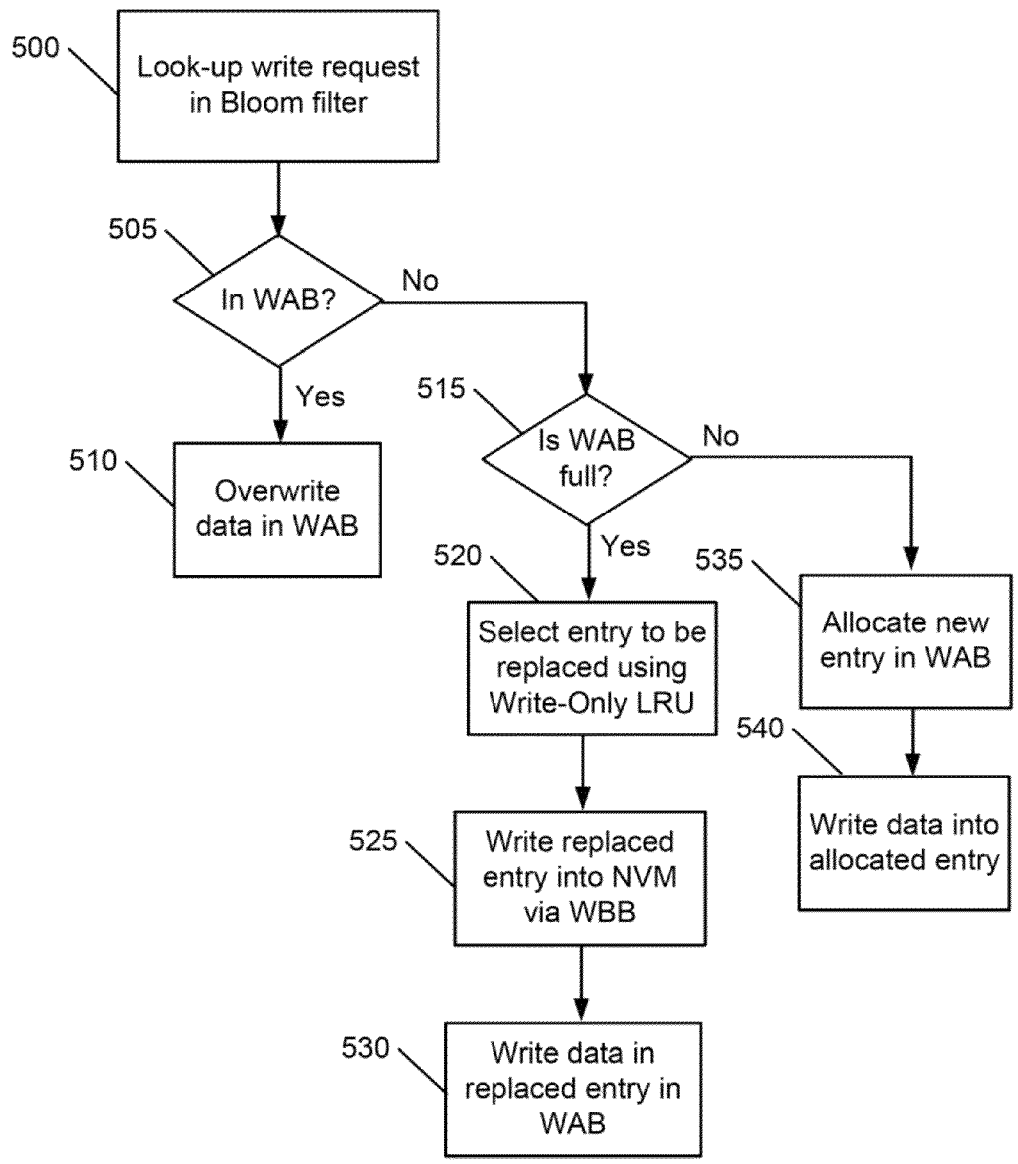
FIG. 5 is an example flowchart for writing data in a non-volatile memory using a write-absorbing buffer.

Referring now to FIG. 5, an example flowchart for writing data in a non-volatile memory using a write-absorbing buffer is described. When a processor module sends a write request to a non-volatile memory, the write request is looked up in a Bloom filter before accessing a write-absorbing buffer connected to the non-volatile memory (500). If the Bloom filter indicates (505) that the data to be written is already in the write-absorbing buffer, the data is rewritten into the appropriate location in the buffer (510). In this case, the data is said to be "dirty" as it has been rewritten with a new value.

If the Bloom filter indicates that the data to be written is in the write-absorbing buffer, then the processor module checks the tag portion in the write-absorbing buffer to ensure that a false positive has not occurred, i.e., to ensure that the data is indeed in the buffer and a hit has occurred. The process module then checks whether the write-absorbing buffer is full (515). In the case of a full buffer, before writing the new data into it, an existing entry needs to be replaced. The entry to be replaced is selected by applying a Write-Only LRU replacement policy, which, as described above, only replaces the least recently written entries (520). The selected entry is then written into the non-volatile memory (525) and the new data is written into the replaced entry (530). Otherwise, if the write-absorbing buffer is not full, a new entry is allocated (535) and the data is written into the allocated entry (540).

It is appreciated that when writing data into the non-volatile memory a write-back buffer (e.g., write-back buffer 215 shown in FIG. 2) may be used to temporarily store the data prior to writing into memory. This may be done to bridge any gap between the writing speed of the write-absorbing buffer and the non-volatile memory. It is also appreciated that the dirty-data, small-sized write-absorbing buffer effectively captures considerably more write requests than a conventional cache or a Flash-aware cache, thereby achieving the goal of significantly reducing the write traffic to the non-volatile memory.

Further write traffic reductions can be achieved during many applications, including, for example, during copy-on-write ("COW") events for shared pages. For example, in a virtualized environment, pages across different virtual machines often have the same or only slightly different content. Current implementations have pages with the same content pointing to a common reference page (called "content-based sharing"), and employ COW to detect writes that break the content sharing between the virtual machines. As described below, a write-absorbing buffer can be used to make a COW process much more efficient, thereby further improving the write performance of a non-volatile memory.

Figure 6:
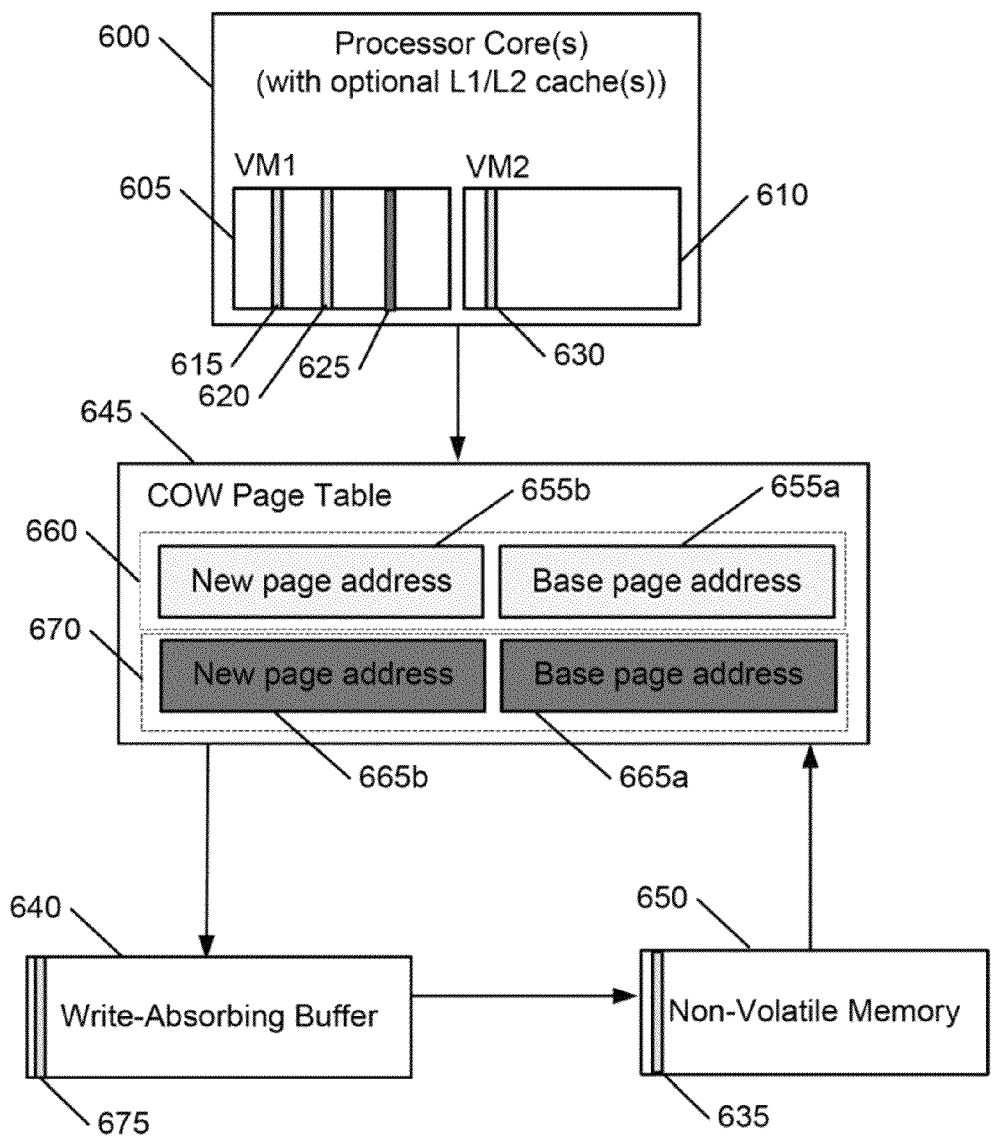
FIG. 6 is a schematic diagram showing an example of using a write-absorbing buffer for a copy-on-write.

Referring now to FIG. 6, a schematic diagram showing an example of using a write-absorbing buffer for a COW is described. Processor module 600 runs virtual machines 605 and 610, with each virtual machine having various pages, such as pages 615-625 in virtual machine 605 ("VM1") and page 630 in virtual machine 610 ("VM2"). In this example, pages 615, 620 and 630 are shown to be identical or have a very similar content, such that a single copy of pages 615, 620, and 630 may be stored in memory as page 635. As long as the virtual machines 605 and 610 do not attempt to write on the pages 615, 620, and 630, they can share the same copy 635. If a write into one of the pages is attempted by the OS in the virtual machines 605-610, a copy of the page must be generated (i.e., a copy-on-write or COW). To avoid writing this new page into memory every time a write to a page occurs, a write-absorbing buffer (e.g., the write-absorbing buffer 640) can be used to improve the write traffic.

This is accomplished by having a COW table 645 that can be accessed by both a write-absorbing buffer 640 and a non-volatile memory 650 to reference the pages stored thereon. The COW table 645 hides the overhead associated with copying the shared page into a newly allocated page in the non-volatile memory 650 every time a write occurs. Each entry in the COW table 645 has a base address and a new page address, such as base page address 655a and new page address 655b in entry 660 and the base page address 665a and the new page address 665b in entry 670. The base page address references the original content in the non-volatile memory 645 (e.g., the original shared or base page 635) and the new page address references the new page (e.g., the new page 675) in the write-absorbing buffer 640. Entries in the COW table 645 are indexed or searched by the new page address portion.

It is appreciated that the new page contains the written content written into one of the shared pages. For example, for pages 615, 620, and 630 sharing a similar or identical content and having a shared copy of a page 635 stored in the non-volatile memory 650, the new page 675 may contain the content written into one of the pages 615, 620, and 630. This new page 675 reflects the new content written into a page when the other pages' content remain the same and can be accessed into the shared page 635.

A new entry in the COW table 645 is created when a COW event is triggered. Instead of allocating a new page in the non-volatile memory 650 and copying the data from the base page to create a replica, however, a new page can be temporarily allocated in the write-absorbing buffer 640. The new page is referenced by the new page address in a corresponding entry in the COW table 645, while the shared or "base" page (i.e., the page with the original content in the non-volatile memory 650 such as page 635) is referenced by the base page address. Follow up accesses to the new page are either served by the write-absorbing buffer 640 or the non-volatile memory 650. Meanwhile, the new page is not required to be written in the non-volatile memory 650 until one of its newly written data gets evicted from the write-absorbing buffer 640, and the operation of replicating the new page content can overlap with normal execution, which could hide the slow COW process and potentially reduce more writes.

Figure 7:
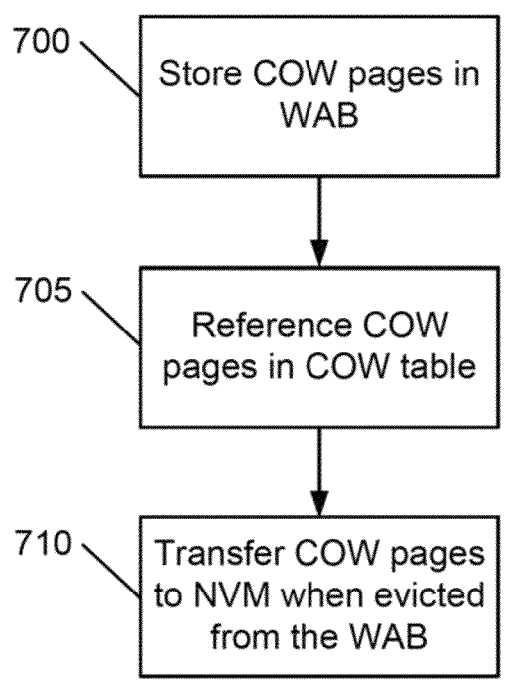
FIG. 7 is an example flowchart for using a write-absorbing buffer for a copy-on-write.
Figure 8:
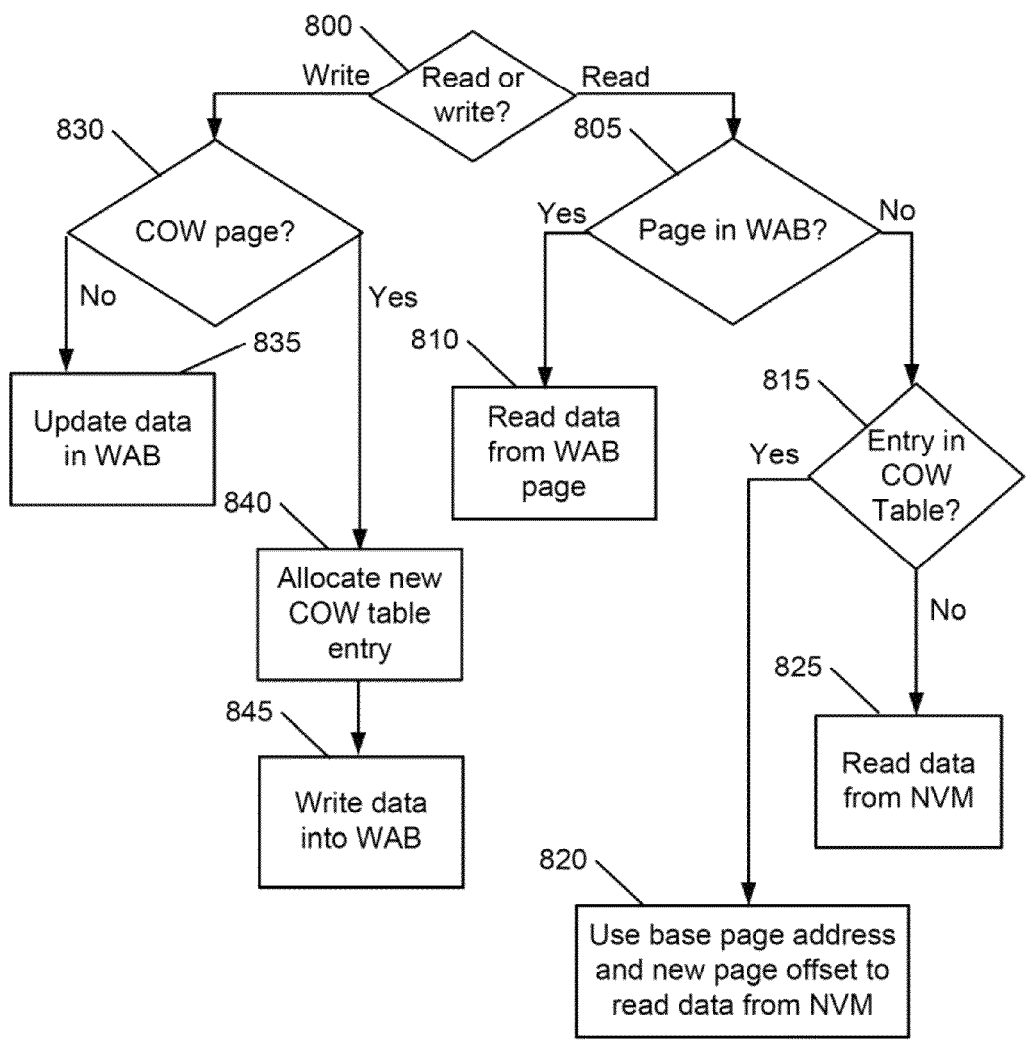
FIG. 8 is an example flowchart for read and write accesses for multiple virtual machines employing copy-on-write.

This process can be better understood in FIGS. 7 and 8, which illustrate an example flowchart for using a write-absorbing buffer for a copy-on-write (FIG. 7) and an example flowchart for read and write accesses for multiple virtual machines employing COW (FIG. 8). As described above, copy-on-write pages can be stored in a write-absorbing buffer (e.g., buffer 640) prior to writing them into a non-volatile memory (e.g., memory 650) to reduce the write traffic for the memory (705). The copy-on-write pages are referenced by a COW table (e.g., COW table 645) and transferred into the memory only when evicted from the write-absorbing buffer.

As shown in FIG. 8, read accesses (800) depend on whether the data block to be read has already been written and hence resides in the WAB (805). If so, the data block can be read from the write-absorbing buffer (810); otherwise, a check is performed (either sequentially or in parallel with the previously described WAB access) to see if the data block belongs to a new page entry in the COW table 645 (815). If so, this indicates that the page has been previously written to the write-absorbing buffer 640 but the specific data block within the larger page has not been written since the creation of the new page (e.g., the corresponding data block in the base page has not been changed and hence should be used). In this case, the page can be read from the non-volatile memory 650 by using the base page address with an offset from the new page address in the corresponding entry in the COW table 645 (820). Otherwise, if no references in the COW table 645 exist, the page is read directly from the non-volatile memory 650 (825).

Write accesses (800) depend on whether the page to be written is a COW page (830). If not, the page is simply written into the write-absorbing buffer (835) without writing it into the non-volatile memory. Otherwise, a new entry is allocated into the COW table 645 (840) and the data is written into the write-absorbing buffer (845). Note that the pages in the write-absorbing buffer 640 are only written into the non-volatile memory 650 when they are evicted (i.e., when they need to be replaced) from the buffer 640.

It is appreciated that, in contrast to previous Flash or PCM caches, the write-absorbing buffer described herein above is mainly optimized to reduce writes to the non-volatile memory by caching dirty blocks and managing cache content for write filtering. Therefore its benefits include simplicity (e.g., no need to consider Flash block size, erase, etc.), small size (less capacity needed by excluding clean blocks), better effectiveness (in terms of write filtering) and less overhead needed to avoid silent stores. Further benefits include reducing write overhead by using a Bloom filter, a write-back buffer, and backup power as described above.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. For example, it is appreciated that the present disclosure is not limited to a particular computing system configuration, such as those illustrated in FIGS. 3A-I.

Those of skill in the art would further appreciate that the various illustrative modules and steps described in connection with the embodiments disclosed herein may be implemented as electronic hardware, computer software, or combinations of both. For example, the example steps of FIGS. 4, 5, and 7 may be implemented using software modules, hardware modules or components, or a combination of software and hardware modules or components. Thus, in one embodiment, one or more of the example steps of FIGS. 4, 5, and 7 may comprise hardware modules or components. In another embodiment, one or more of the steps of FIGS. 4, 5, and 7 may comprise software code stored on a computer readable storage medium, which is executable by a processor.

To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A data storage apparatus, comprising:
 a processor module;
 a non-volatile memory data store storing a base page for access by two or more virtual machines; and
 a write-absorbing buffer between the processor and the non-volatile memory data store to operate as a dirty first level cache that allocates new blocks only for write requests and not read requests, the write-absorbing buffer having at least one copy-on-write page associated with the base page for access by one of the two or more virtual machines.

2. The data storage apparatus of claim 1, wherein the processor module comprises at least one processor core.

3. The data storage apparatus of claim 1, wherein the non-volatile memory data store comprises a non-volatile memory selected from the group consisting of a Memristor and a Phase-Change Memory.

4. The data storage apparatus of claim 1, wherein the write-absorbing buffer comprises a volatile memory.

5. The data storage apparatus of claim 1, further comprising a Bloom filter to look-up read and write requests from the processor module to the non-volatile memory.

6. The data storage apparatus of claim 1, further comprising a write-back buffer between the write-absorbing buffer and the non-volatile memory data store.

7. The data storage apparatus of claim 6, further comprising a backup power to provide power to the write-absorbing buffer and the write-back buffer in case of a power failure.

8. The data storage apparatus of claim 1, wherein the write-absorbing buffer comprises a write-only least-recently-used cache replacement policy to evict a least recently used block into the non-volatile memory data store.

9. The data storage apparatus of claim 1, further comprising a copy-on-write table to store addresses for copy-on-write pages in the write-absorbing buffer and in the non-volatile memory data store.

10. The data storage apparatus of claim 9, wherein the addresses comprise a base page address for the base page in the non-volatile memory and a new page address for the copy-on-write page in the write-absorbing buffer.

11. A method, comprising:
 storing a copy-on-write page in a write-absorbing buffer between a processor module and a non-volatile memory, the write-absorbing buffer operating as a dirty first level cache that allocates new blocks only for write requests and not read requests;
 storing a base page associated with the copy-on-write page on the non-volatile memory;
 referencing the copy-on-write page in a copy-on-write table associated with the write-absorbing buffer; and
 writing the copy-on-write page from the write-absorbing buffer to the non-volatile memory when at least one block from the copy-on-write page is evicted from the write-absorbing buffer.

12. The method of claim 11, further comprising using a Bloom filter to look up read and write requests from the processor module to the write-absorbing buffer.

13. The method of claim 11, wherein storing the base page comprises storing a base page address in the copy-on-write table to reference the base page.

14. The method of claim 11, wherein the copy-on-write page comprises a written update to the base page.

15. The method of claim 11, wherein the copy-on-write table comprises a page address for the copy-on-write page.

16. The method of claim 11, wherein writing the copy-on-write page from the write-absorbing buffer to the non-volatile memory comprises implementing a write-only least-recently-used cache replacement policy to evict the copy-on-write page from the write-absorbing buffer.

17. A write-absorbing buffer between a processor module and a non-volatile memory, comprising:
 a volatile memory;
 a copy-on-write table coupled to the volatile memory to reference a copy-on-write page stored in the volatile memory, the copy-on-write page corresponding to a base page stored in the non-volatile memory; and
 a Bloom filter to look-up read and write requests from the processor module into the non-volatile memory coupled to the write-absorbing buffer, the write-absorbing buffer operating as a dirty first level cache that allocates new blocks only for write requests and not read requests.

18. The write-absorbing buffer of claim 17, further comprising a backup power coupled to the volatile memory to power up the volatile memory in case of a power failure.

* * * * *